US009777527B2

(12) United States Patent
Scholz et al.

(10) Patent No.: US 9,777,527 B2
(45) Date of Patent: Oct. 3, 2017

(54) WINDOW LIFTER FOR A VEHICLE AND METHOD FOR OPERATING SUCH A WINDOW LIFTER

(71) Applicant: BROSE FAHRZEUGTEILE GMBH & CO. KOMMANDITGESELLSCHAFT, BAMBERG, Bamberg (DE)

(72) Inventors: Marcus Scholz, Lichtenfels (DE); Christoph Straub, Lautertal (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 59 days.

(21) Appl. No.: 14/753,455

(22) Filed: Jun. 29, 2015

(65) Prior Publication Data

US 2015/0376930 A1 Dec. 31, 2015

(30) Foreign Application Priority Data

Jun. 28, 2014 (DE) ........................ 10 2014 009 714

(51) Int. Cl.

*H02P 1/00* (2006.01)
*E05F 15/695* (2015.01)
*E05F 15/697* (2015.01)

(52) U.S. Cl.

CPC .......... *E05F 15/695* (2015.01); *E05F 15/697* (2015.01); *E05Y 2400/32* (2013.01)

(58) Field of Classification Search

CPC ...... H02P 3/08; H02P 3/06; H02P 7/03; H02P 7/00; G01D 1/18; G01D 11/26; G05B 2219/2628; H02H 7/0851

(Continued)

(56) References Cited

U.S. PATENT DOCUMENTS 4,722,545 A * 2/1988 Gretz ................ B60G 17/0162 180/252
5,459,379 A * 10/1995 Takeda .................. E05F 15/695 318/266

(Continued)

FOREIGN PATENT DOCUMENTS

CN 2813830 Y 9/2006
CN 101963019 A 2/2011

(Continued)

*Primary Examiner* — Bickey Dhakal
(74) *Attorney, Agent, or Firm* — Laurence A. Greenberg; Werner H. Stemer; Ralph E. Locher

(57) ABSTRACT

For the purpose of realizing an operationally reliable window lifter (opener) for a vehicle, there is provision to ascertain from an operating variable of a servomotor in each case a measure of a regulated position of the window pane in the course of a plurality of operating cycles of the window lifter in which a window pane of the vehicle is opened and closed again, in each case entirely or partly. In each operating cycle, or at least in selected operating cycles, the measure is normalized to a reference value if at the end of the respective operating cycle the window pane is driven by the servomotor for at least a predetermined blocked time beyond a blocked position. The blocked time is shortened if the normalization was not carried out for a predetermined number of consecutive operating cycles.

10 Claims, 2 Drawing Sheets

(58) Field of Classification Search
USPC ........................................................ 318/257
See application file for complete search history.

(56) References Cited

U.S. PATENT DOCUMENTS

| | | | | |
|---|---|---|---|---|
| 5,483,135 | A | 1/1996 | Parks | |
| 6,346,787 | B1 * | 2/2002 | Lamm | G05B 19/4015 318/266 |
| 6,552,506 | B2 * | 4/2003 | Kramer | G05B 19/231 296/216.01 |
| 9,109,924 | B2 * | 8/2015 | Vetter | G01D 1/18 |
| 2003/0011336 | A1 | 1/2003 | Kramer et al. | |
| 2011/0016794 | A1 | 1/2011 | Nishikibe et al. | |
| 2011/0225894 | A1 | 9/2011 | Ewald et al. | |
| 2011/0233291 | A1 * | 9/2011 | Huck | H02P 7/00 236/93 R |
| 2013/0271058 | A1 | 10/2013 | Schlesiger et al. | |

FOREIGN PATENT DOCUMENTS

| | | | |
|---|---|---|---|
| CN | 102712268 | | 10/2012 |
| CN | 103375086 | A | 10/2013 |
| DE | 19514954 | A1 | 12/1995 |
| DE | 19536207 | A1 | 4/1996 |
| DE | 10028041 | A1 | 12/2001 |
| DE | 102005018013 | A1 | 10/2006 |
| DE | 102011122022 | A1 | 6/2013 |
| GB | 2290153 | A | 12/1995 |

* cited by examiner

WINDOW LIFTER FOR A VEHICLE AND METHOD FOR OPERATING SUCH A WINDOW LIFTER

CROSS-REFERENCE TO RELATED APPLICATION

This application claims the priority, under 35 U.S.C. §119, of German application DE 10 2014 009 714.5, filed Jun. 28, 2014; the prior application is herewith incorporated by reference in its entirety.

BACKGROUND OF THE INVENTION

Field of the Invention

The invention relates to a window lifter for a vehicle, in particular for a motor vehicle. The invention relates, in addition, to a method for operating such a window lifter.

Motorized window lifters are ordinarily employed in motor vehicles in order to displace movable window panes, in particular side windows of the motor vehicle, between their closed position and their open position. For this purpose a window lifter ordinarily includes an electric actuator, which has been coupled to the window pane via a servomechanism, and also a control unit for driving the actuator.

As a rule, such window lifters are also configured to carry out—in addition to manually controlled regulating operations, the entire sequence of which is controlled by a user of the vehicle via operating keys or by some other command initiator—automatic regulating operations. Such automatic regulating operations may be initiated by the user of the vehicle by key actuation and may then be continued automatically by the window lifter—sometimes in this connection merely the completion of the regulating operation is effected automatically. But automatic regulating operations may also have been already instigated by the window lifter itself or by other components of the vehicle, and may consequently proceed without any interaction with the user of the vehicle.

In this connection a distinction is to be made between, on the one hand, major automatic regulating operations (designated in the following as "automatic running"), in which the window pane is displaced by the window lifter over the entire displacement path or at least a significant part of the same (typically, by several centimeters or decimeters), in particular until the closed position or open position is reached, and, on the other hand, minor automatic regulating operations, in which the window pane is moved only slightly (as a rule, by a few millimeters) in accordance with regulations. The minor automatic regulating operations include, in particular, the short stroke that is conventional in motor vehicles with frameless doors, by which the closed window pane is moved out of the window seal in order to permit the opening of the door, or a function for setting a "smoker's gap", which is sometimes provided.

In order to carry out automatic regulating operations, the window lifter has to know the current position of the window pane. For this purpose, modern window lifters ordinarily register an operating variable of their actuator, and calculate from this a measure of the regulated position of the window pane. For the purpose of differentiation from the actual, mechanical regulated position of the window pane, this calculated measure is designated as the "logical regulated position".

Sometimes the motor current of the actuator or characteristic fluctuations (current ripples) thereof are used by way of the operating variable for calculating the logical regulated position. But the angle of revolution of the motor shaft during the regulating operation is mostly used by way of the operating variable (in this connection the angle of revolution may be specified, in particular, also in the form of the number of revolutions of the motor shaft, or in other dimensionless units). For the purpose of registering the angle of revolution, a window lifter often includes a Hall-effect sensor which interacts with an annular magnet coupled with the motor shaft in a rotationally fixed fashion. Window lifters have in this connection often been equipped with dual Hall-effect sensors, from the measuring signal of which the direction of adjustment can be detected unequivocally. But simple window lifters are sometimes provided merely with a single Hall-effect sensor, the measuring signal of which specifies the angle of revolution in direction-invariant form. For a given angle of revolution of the motor shaft, such a single Hall-effect sensor always generates the same measuring signal, irrespective of the direction of rotation of the motor shaft. In order to be able to determine the logical regulated position from this measuring signal, the direction of rotation is inferred by the window lifter on the basis of the boundary conditions of the ongoing regulating operation.

However, the determination, described above, of the logical regulated position is generally susceptible to counting errors which result in a deviation of the logical regulated position from the mechanical regulated position. Such counting errors are routinely caused, in particular, by movements of the servomechanism that are caused not by the driving of the actuator but, by way of example, by mechanical relaxation of the servomechanism, by vibrations or changes of temperature induced by travel. In addition, counting errors may also be caused by manufacturing tolerances of the Hall-effect sensors or by aging phenomena (e.g. the elongation of the cable induced by travel in the case of a cable-type window lifter). Such counting errors may, under unfavorable circumstances, add up over several operating cycles, so that in the course of several operating cycles the mechanical regulated position and the logical regulated position of the window pane increasingly drift apart. This drift is particularly severe in the case of window lifters with single Hall-effect sensors, since here such window movements not caused by the actuator are routinely counted in the wrong direction by the window lifter.

However, an excessive deviation of the logical regulated position from the mechanical regulated position in the operation of a window lifter should be avoided, especially since it can result in faulty execution of automatic regulating operations. For this reason, window lifters are ordinarily re-normalized routinely, wherein the logical regulated position is approximated to the mechanical regulated position by resetting to a reference value. For the purpose of re-normalization, the window pane is routinely moved into the upper blocked position by the window lifter. In this blocked position the logical regulated position is then set to zero, for example.

The blocked position is ordinarily detected by the fact that the movement of the window comes to a halt for more than a defined blocked time, for example more than 300 ms, despite continued driving of the actuator. In order to avoid faulty normalization of the window lifter, the re-normalization is performed only when the above condition has been satisfied—that is to say, when the blocked time is exceeded.

However, the re-normalization is problematic in the case of window lifters such as are frequently employed in coupes and convertibles for the rear windows of the vehicle. In such window lifters—which are frequently configured as track-guided window lifters—a jamming-prevention device is often deliberately not provided, especially since in the course of the movement of the window caused by such a window lifter lateral gaps (shear gaps) routinely arise in which, by reason of the shear forces arising, a case of jamming may, on the one hand, result in serious injuries but, on the other hand, can hardly be detected by a jamming-prevention device. By reason of the lack of a jamming-prevention device, in such window lifters automatic running into the closed position has, for safety reasons, also routinely not been provided. Rather, such a window lifter can be closed only by permanent manual pressure on an operating key.

Reliable detection of the upper blocked position (which presupposes permanent blocking of the movement of the window over the entire blocked time) cannot be ensured in this case, since the operating key can be released by the user at any time. Experience here shows that the operating key is frequently released too early, with the result the blocked position cannot be detected. This may have the result that re-normalization does not happen over a plurality of successive operating cycles, which once again may result in a successively increasing deviation of the logical regulated position from the mechanical regulated position, and, in the case of a sufficiently large deviation, in malfunctions of the window lifter in question.

SUMMARY OF THE INVENTION

The object underlying the invention is to specify reliable operation of a window lifter, in particular of a window lifter without automatic running.

The invention takes as its starting-point a window lifter for a vehicle, in particular for a motor vehicle, with an electric actuator by which a window pane of the vehicle is reversibly displaceable between an open state (open position) and a closed state (closed position).

According to the method, the assigned window pane is repeatedly opened and closed again, in each case entirely or partly, by the window lifter. Such a combination of regulating operations, in the course of which the window pane is moved out of its closed position and is later moved back again into the closed position, is designated in the following as the operating cycle of the window lifter. During each operating cycle a measure of the (mechanical) regulated position of the window pane is ascertained from an operating variable of the actuator, this measure—as introduced initially—being designated as the logical regulated position. In each operating cycle, or at least in selected operating cycles (e.g. in each n-th operating cycle where n=2, 3, . . . ), a (re)normalization procedure is carried out in which the logical regulated position is normalized to a reference value (that is to say, equated to the reference value) if at the end of the respective operating cycle the window pane is driven by the actuator for at least a predetermined blocked time beyond a blocked position.

By "driving of the window pane by the actuator" in this connection it is understood that the actuator exerts a regulating force on the window pane that, in terms of absolute value, is sufficient under normal operating conditions to move the open window pane into the closed position. A regulated position of the window pane in which the movement of the window pane has been blocked also under the influence of the regulating force exerted by the actuator is designated as the "blocked position". In this connection the blocked position may deviate slightly from the closed position in which the movement of the window pane is stopped by the window lifter in the course of the closing of the window pane. A period of time, predetermined as a threshold value, which in accordance with the method is compared with the period of time that has elapsed after the blocked position has been reached with continued driving of the actuator is designated as the "blocked time". Finally, the supply of a motor current to the actuator is designated as the "driving of the actuator".

In accordance with the method, the blocked time is shortened if the normalization of the logical regulated position to the reference value was not carried out for a predetermined number of consecutive operating cycles.

In one expedient implementation of the method, in the course of the re-normalization procedure a check is made as to whether the blocked time is being reached. If this is the case, the logical regulated position is normalized to a reference value, and a counter is reset to the value zero. Otherwise, the logical regulated position is not normalized to the reference value. Instead of this, the counter is incremented, with the result that in each operating cycle the counter specifies the number of operating cycles that have taken place without re-normalization. Depending on the counter, the blocked time is shortened here.

In one expedient implementation of the method, the blocked time is shortened, continuously or repeatedly in predetermined stages, as a function of the number of consecutive operating cycles without (re)normalization.

In order to be able to distinguish the blocked position reliably from a possible case of jamming in this connection, the detection of blocking is preferably carried out only in a safe regulated-position range in which a case of jamming is typically excluded. In a typical configuration, the safe regulated-position range is defined by the fact that the width of the window gap between the upper edge of the window and the upper window seal amounts—according to the logical regulated position—to between 0 mm and 4 mm.

By virtue of the method according to the invention, the operational reliability of the window lifter is improved by virtue of the fact that a sensible balance is struck between the precision of the re-normalization procedure and the demands made of the re-normalization. So long as the last re-normalization took place only a short time ago, and consequently no great error in the logical regulated position is to be expected, the probability of a faulty normalization is minimized by virtue of the blocked time, which in this case has been set high. Consequently, under normal operating conditions high precision of the re-normalization is ensured. If, on the other hand, the last re-normalization took place a comparatively long time ago, and therefore critical drifting apart of the logical and mechanical regulated positions is imminent, the requirements for the re-normalization are reduced by shortening the blocked time. By accepting a certain transient loss of precision in connection with the re-normalization, it is consequently ensured that re-normalization actually takes place. The risk of functional impairment of the window lifter occurring insidiously is effectively counteracted by this means.

In principle, the method within the scope of the invention may be employed with all motorized window lifters. But the method is employed particularly advantageously in the case of a window lifter, the functional range of which does not have automatic running (that is to say, a major automatic regulating operation) into the closed position, and with which consequently the window pane is closed by the actuator only for the duration of a regulating command generated by user interaction via a command initiator (in particular, via an operating push-button). By reason of the lack of automatic running, the window lifter has expediently not been equipped with a jamming-prevention function either.

In addition, in the course of the method the angle of revolution or the rotational speed of the motor shaft is preferably used by way of the operating variable of the actuator which is taken into consideration for the calculation of the logical regulated position, the angle of revolution or the rotational speed being determined from a rotation-direction-invariant measuring signal (that is to say, a signal that is independent of the direction of rotation). By way of the signal initiator for this rotation-direction-invariant measuring signal, in an expedient implementation a single Hall-effect sensor is used which interacts with an annular magnet coupled to a motor shaft of the actuator.

The window lifter according to the invention includes, in addition to the actuator, a control unit for driving the actuator. In this connection the control unit is configured—by programming and/or by circuitry—to carry out the method according to the invention, described above. The control unit is consequently configured, in concrete terms, to ascertain from an operating variable of the actuator (in particular, from the angle of revolution or the rotational speed) the logical regulated position, introduced above, of the window pane in the course of a movement of the window pane by the actuator. The control unit is furthermore configured to normalize the logical regulated position to a reference value at the end of each operating cycle in which the window pane is entirely or partly opened and closed again by the actuator, or at least in selected operating cycles, if at the end of the respective operating cycle the window pane is driven by the actuator for at least the predetermined blocked time beyond the blocked position. In accordance with the invention, the control unit is configured to shorten the blocked time if the normalization was not carried out for a predetermined number of consecutive operating cycles. In this case the control unit is preferably configured to shorten the blocked time, continuously or repeatedly in predetermined stages, as a function of the number of consecutive operating cycles in which the normalization was not carried out.

The window lifter is preferably a window lifter without automatic running (and, in particular, also without jamming prevention). Correspondingly, the control unit is preferably configured to drive the actuator at least for the purpose of closing the window pane only for the duration of a regulating command generated by user interaction via a command initiator.

In addition, the control unit has preferably been configured to determine, by way of the operating variable of the actuator, the angle of revolution or the rotational speed of the motor shaft on the basis of a rotation-direction-invariant measuring signal. For the purpose of generating this rotation-direction-invariant measuring signal, the window lifter includes, in an expedient implementation, a single Hall-effect sensor which interacts with an annular magnet coupled to a motor shaft of the actuator.

In one preferred configuration the control unit is formed, at least in essence, by a microcontroller in which the functionality for carrying out the method according to the invention is implemented in the form of firmware by programming, with the result that the method—where appropriate, in interaction with a user of the vehicle—is carried out automatically in the microcontroller when the firmware is executed. But within the scope of the invention the control unit may alternatively also be formed by a non-programmable electronic component, for example an ASIC, in which the functionality for carrying out the method according to the invention is implemented by circuit-engineering means.

The window lifter preferably takes the form of a track-guided window lifter.

Other features which are considered as characteristic for the invention are set forth in the appended claims.

Although the invention is illustrated and described herein as embodied in a window lifter for a vehicle and a method for operating such a window lifter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and variables corresponding to one another are always provided with the same reference symbols in all the figures.

Figure 1:
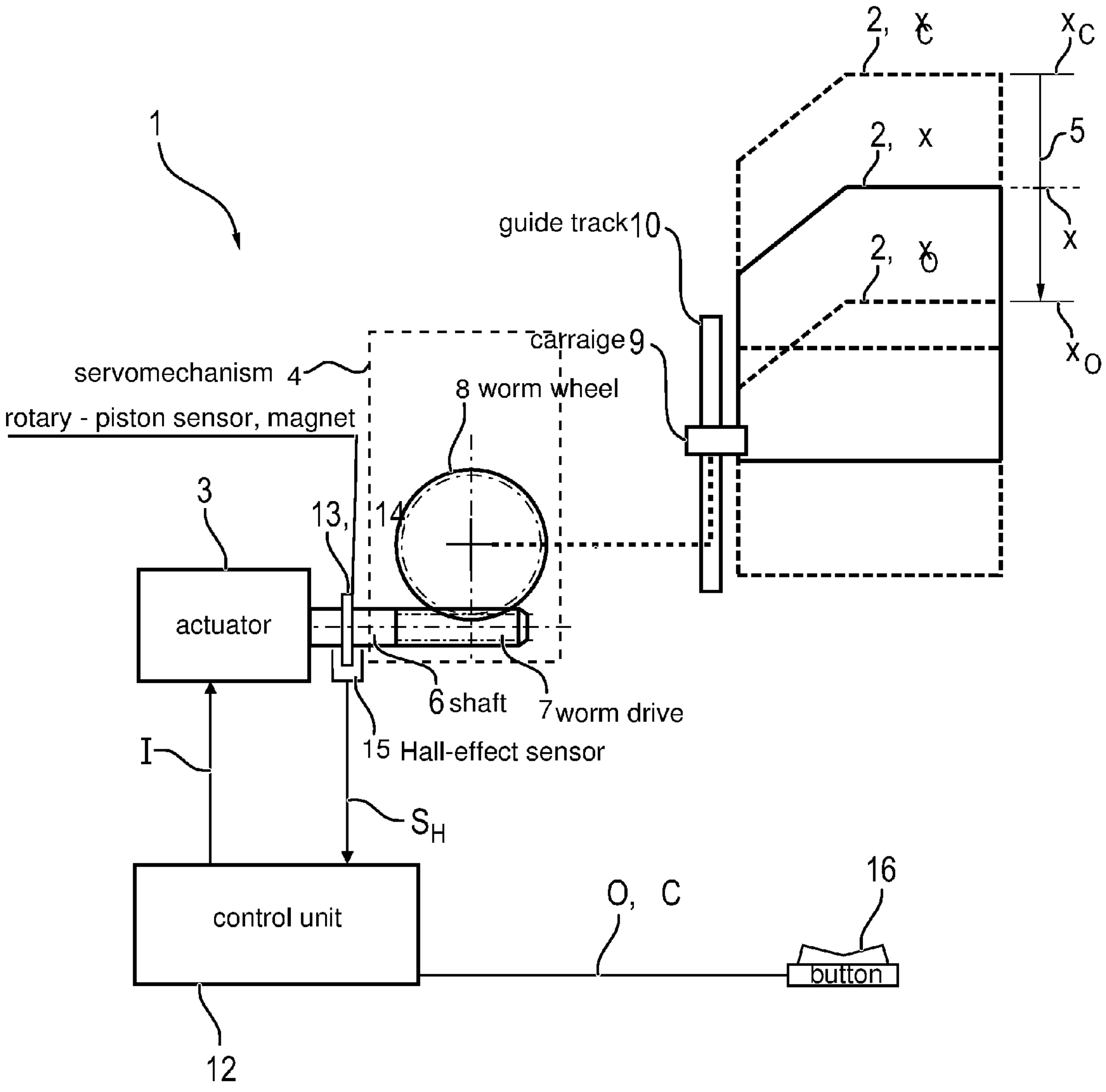
FIG. 1 is an illustration showing a track-guided window lifter with an electric actuator, with a control unit, and also a window pane of a vehicle, coupled to the actuator via a servomechanism according to the invention.

Referring now to the figures of the drawings in detail and first, particularly to FIG. 1 thereof, there is shown schematically a regulating device in the form of a track-guided window lifter 1 for a (vehicle) window pane 2 of a motor vehicle.

The window lifter 1 includes an electric actuator 3 which is mechanically coupled to the window pane 2 via a servomechanism 4 in such a manner that the window pane 2 is reversibly displaceable by the actuator 3 along a displacement path 5 between two end positions, namely an open position xO and a closed position xC.

FIG. 1 shows the window pane 2 in the open position xO and in the closed position xC, in each case with dashed outlines. The window pane 2 is represented by a continuous outline in an arbitrary intermediate regulated position x between the two end positions. In a data-processing sense, the open position xO and the closed position xC may be interpreted as constant numeric variables. The closed position xC, which in the example represented has been chosen to be identical to the upper blocked position of the window pane 2, is assigned the value zero (xC=0), by way of example. The open position xO is assigned a positive value (xO>0), by way of example. The regulated position x may in this case be interpreted as a variable that may assume values between xC and xO (xC≤x≤xO).

The servomechanism 4 includes a drive worm 7 mounted on a motor shaft 6 of the actuator 3, which drive worm 7 meshes with a worm wheel 8. The servomechanism 4—indicated in FIG. 1 only in greatly simplified form—acts on a sliding carriage 9 which is guided on a guide track 10 and to which, in turn, the window pane 2 is fixed.

The regulating device 1 furthermore includes a control unit 12 and also a rotary-position sensor 13. The rotary-position sensor 13 includes a multi-polar annular magnet 14 mounted on the motor shaft 6 in a rotationally fixed fashion, and also a Hall-effect sensor 15 interacting with the magnet. During the operation of the actuator 3, the annular magnet 14, rotating together with the motor shaft 6 relative to the Hall-effect sensor 15, generates, through interaction with the Hall-effect sensor 15, a periodically oscillating pulse signal SH which is supplied as an input variable to the control unit 12 by the Hall-effect sensor 15. In this connection the control unit 12 calculates, by counting the (Hall-effect) pulses of the pulse signal SH, a variable proportional to the number of rotations of the motor shaft 6 during a regulating operation, which in the following is designated as the angle of revolution $\phi$. By summation of the angle of revolution $\phi$ with a stored value $x'_0$ of the initial position of the window pane 2, the control unit 12 calculates a time-dependent measure of the regulated position of the window pane 2, which is designated in the following as the logical regulated position x':

$$x'(t)=x'_0+c\cdot\phi(t), \qquad \text{Eqn. 1.}$$

The parameter c in Eqn. 1 stands for an empirically established constant of proportionality.

The Hall-effect sensor 15 is a single Hall-effect sensor which provides the pulse signal SH as a rotation-direction-invariant variable. The angle of revolution $\phi$, determined by counting the Hall pulses, consequently always has a positive value, irrespective of the direction of rotation of the actuator 3. For the purpose of determining the logical regulated variable x', the control unit 12 presets the parameter c with a positive or negative sign, depending on the direction of rotation assumed by it.

The control unit 12, in addition, drives the actuator 3 by outputting a motor current I. In the case of the regulating device 1, for safety reasons no automatic running in the closing direction and no prevention of jamming have been implemented. In the course of a major movement of the window pane 2 in the closing direction the control unit 12 consequently drives the actuator 3 only for the period in which a user of the vehicle actuates a corresponding operating push-button 16. However, the control unit 12 executes minor movements of the window pane 2, in particular a brief thrust, automatically without interaction with the user of the vehicle.

In order to prevent the deviation of the logical regulated position x' from the mechanical regulated position x as a consequence of counting errors, in the course of each operating cycle of the window lifter 1 the control unit 12 carries out the method described in the following on the basis of FIG. 2. In the control unit 12, which is formed substantially by microcontrollers, the functionality for carrying out the method automatically is implemented by software engineering.

Figure 2:
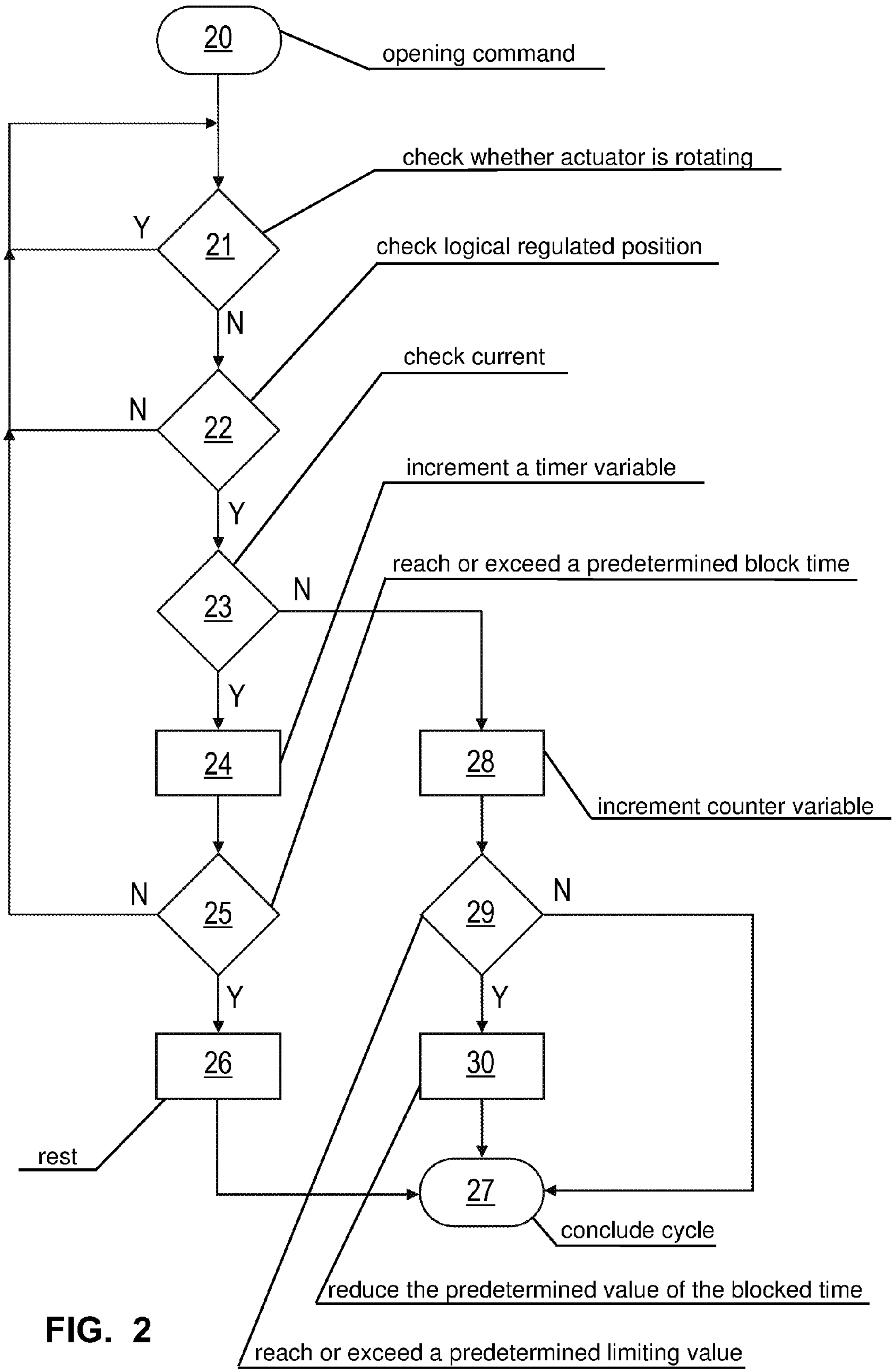
FIG. 2 is a simplified flowchart for explaining a method for operating the window lifter.

A cycle of the method—corresponding to an operating cycle of the window lifter 1—begins, according to FIG. 2, in a step 20 with the reception of an opening command O given by the user of the vehicle via the operating push-button 16 (FIG. 1).

In a step 21 the control unit 12 checks, by monitoring the pulse signal SH, whether the actuator 3 is still rotating. So long as this is the case (Y), step 21 is repeated by the control unit 12, continuously or at defined time-intervals.

Otherwise (N), i.e. if the actuator 3 is stationary, the control unit 12 checks, in a step 22, whether according to the logical regulated position x' the window pane 2 has again arrived sufficiently close to its closed position xC by virtue of the fact that the user of the vehicle has in the meantime closed the window pane 2 by outputting a closing command C (FIG. 1) by means of the operating push-button 16. In this connection the control unit 12 checks, in concrete terms, whether the logical regulated position x' falls short of a predetermined threshold value. This threshold value is preferably chosen in such a way that—given sufficient agreement of the logical regulated position x' with the mechanical regulated position x—the upper edge of the window pane 2 has been spaced apart from the upper window seal by a maximum of 4 mm.

So long as this condition has not been satisfied (N), the control unit 12 takes this as an indication that the ongoing operating cycle has not yet been concluded, and returns to step 21.

Otherwise (Y)—that is to say, if the control unit 12 establishes that the actuator 3 is stationary (step 21), and if the window pane 2 is located close to its closed position xC (step 22)—the control unit 12 checks, in a step 23, whether the actuator 3 is still being supplied with current (I>0).

If this is the case (Y), the control unit 12 takes this as an indication that the window pane 2 has reached its upper blocked position. In this case, the control unit 12 increments, in a step 24, a timer variable that specifies the time elapsed after the blocked position was reached. Subsequently the control unit checks, in a step 25, whether this timer variable (and consequently the time elapsed after the blocked position was reached) has reached or exceeded a predetermined blocked time. So long as this is not the case (N), the control unit 12 returns to step 21.

Otherwise (Y), the control unit 12 takes the reaching of the upper blocked position as confirmed and re-normalizes, in a step 26, the logical regulated position x' by setting the latter to the value zero (x'=0), and concludes the method cycle in a step 27.

If, after the return from step 25, the check performed in step 21 turns out to be positive (Y), or the check performed in step 22 turns out to be negative (N), the control unit 12 assumes that the blocked state was abandoned before the blocked time was reached, and resets the timer variable to zero.

If, on the other hand, the check performed in step 23 turns out to be negative (N), the control unit 12 infers therefrom that the actuator 3 was switched off before the blocked time was reached. In this case, the control unit 12 increments, in a step 28, a counter variable that specifies the number of successive operating cycles without normalization of the logical regulated position x'. Subsequently the control unit 12 checks, in a step 29, whether the value of the counter variable has reached or exceeded a predetermined limiting value.

So long as this is not the case (N), the control unit 12 concludes the method cycle (step 27) without further action.

Otherwise (Y), the control unit 12 reduces, in a step 30, the predetermined value of the blocked time. By way of example, in this connection the blocked time is reduced from the original 300 ms to 200 ms if the counter variable exceeds the value 10. Subsequently the control unit 12 once again concludes the method cycle (step 27).

The method cycle that has been described is executed again with each operating cycle of the window lifter 1. If the blocked time is not reached over several consecutive operating cycles here, the counter variable is increased correspondingly. As soon as the blocked time is reached in a following operating cycle, the counter variable is reset to zero in the course of the normalization (step 26) and, where appropriate, the blocked time is reset to its original value of, for example, 300 ms.

In a variant of the method, the check performed in step 29 and the subsequent reduction of the blocked time (step 30) have a multi-stage structure, with the result that the blocked time is shortened successively in a plurality of stages as a function of the counter variable. By way of example, in this connection the blocked time is reduced from the original 300 ms to 200 ms if the counter variable exceeds the value 10, and is reduced further to 100 ms if the counter variable exceeds the value 20.

In an alternative method variant, the blocked time is reduced continuously, for example linearly, as the value of the counter variable increases.

The invention becomes particularly clear with reference to the embodiment described above but is nonetheless not restricted thereto. Rather, numerous further embodiments of the invention can be deduced from the claims and from the above description.

The following is a summary list of reference numerals and the corresponding structure used in the above description of the invention:

1 Window lifter
2 (Vehicle-) window pane
3 Actuator
4 Servomechanism
5 Displacement path
6 Motor shaft
7 Drive worm
8 Worm wheel
9 Sliding carriage
10 Guide track
12 Control unit
13 Rotary-position sensor
14 Annular magnet
15 Hall-effect sensor
16 Operating push-button
20-30 Step
x (Mechanical) regulated position
xO Open position
xC Closed position
x' (Logical) regulated position
SH Pulse signal
ϕ Angle of revolution
I Motor current
$x'_0$ Initial position
O Opening command
C Closing command

The invention claimed is:

1. A method for operating a window lifter, which comprises the steps of:

repeatedly actuating a window pane in a plurality of operating cycles by an actuator of the window lifter, wherein in each of the plurality of operating cycles, the window pane is entirely or partly opened and closed again;

during the operating cycles, monitoring an operation variable of the actuator, and calculating a logical position based on the operating variable, wherein the logical position is a measure of a mechanical position of the window pane;

in each operating cycle or at least in selected operating cycles, monitoring a movement of the window pane and normalizing the logical position to a reference value upon determining that at an end of a respective operating cycle, the window pane is continued to be driven by the actuator for at least a duration of a predefined blocking time after the window pane has reached a blocking position and using the normalized position of the window pane for controlling an automatic actuating operation with the window lifter.

2. The method according to claim 1, which further comprises shortening the predetermined blocked time, continuously or multiple times in predetermined stages, in dependence on a predetermined number of consecutive operating cycles in which the normalization was not carried out.

3. The method according to claim 1, which further comprises closing the window pane via the actuator only for a duration of a regulating command generated by user interaction via a command initiator.

4. The method according to claim 1, which further comprises registering an angle of revolution or a rotational speed of the actuator by way of an operating variable of the actuator on a basis of a rotation-direction-invariant measuring signal.

5. The method according to claim 4, wherein by way of the rotation-direction-invariant measuring signal, a signal of a single Hall-effect sensor is used, the signal interacting with an annular magnet coupled with a motor shaft of the actuator.

6. A window lifter for a vehicle, comprising:

a actuator for reversible adjustment of an window pane of the vehicle between an open state and a closed state; and a control unit for driving said actuator, said control unit being configured for:

repeatedly actuating a window pane in a plurality of operating cycles by said actuator of the window lifter, wherein in each of the plurality of operating cycles, the window pane is entirely or partly opened and closed again, during the operating cycles, monitoring an operation variable of the actuator, and calculating a logical position based on the operating variable, wherein the logical position is a measure of a mechanical position of the window pane, in each operating cycle or at least in selected operating cycles, monitoring a movement of the window pane and normalizing the logical position to a reference value upon determining that at an end of a respective operating cycle, the window pane is continued to be driven by the actuator for at least a duration of a predefined blocking time after the window pane has reached a blocking position, and using the normalized position of the window pane for controlling an automatic actuating operation with the window lifter.

7. The window lifter according to claim 6, wherein said control unit is configured to shorten the predefined blocking time, continuously or multiple times in predetermined stages, in dependence on a predetermined number of consecutive operating cycles in which the normalization was not carried out.

8. The window lifter according to claim 6, wherein said control unit is configured to drive said actuator, at least for the closing of the window pane, only for a duration of a regulating command generated by user interaction via a command initiator.

9. The window lifter according to claim 6, wherein said control unit is configured to use an angle of revolution or a rotational speed of said actuator by way of the operating variable of said actuator on a basis of a rotation-direction-invariant measuring signal.

10. The window lifter according to claim 9, wherein said actuator has a motor shaft;

further comprising an annular magnet; and further comprising a single Hall-effect sensor which interacts with said annular magnet, coupled to said motor shaft of said actuator, for generating the rotation-direction-invariant measuring signal.

* * * * *